United States Statutory Invention Registration [19]

[11] Reg. Number: H299

Miller, Jr. [43] Published: Jul. 7, 1987

[54] COVERT BEAM PROJECTOR

[75] Inventor: Walter E. Miller, Jr., Huntsville, Ala.

[73] Assignee: The United States of America as represented by the Secretary of the Army, Washington, D.C.

[21] Appl. No.: 943,360

[22] Filed: Dec. 15, 1986

[51] Int. Cl.[4] ..... F41G 7/00
[52] U.S. Cl. ..... 244/3.13

[56] References Cited

U.S. PATENT DOCUMENTS

| | | | |
|---|---|---|---|
| 3,782,667 | 1/1974 | Miller, Jr. et al. | 244/3.13 |
| 4,003,659 | 1/1977 | Conard et al. | 356/152 |
| 4,027,837 | 6/1977 | Miller, Jr. et al. | 244/3.16 |
| 4,234,141 | 11/1980 | Miller, Jr. et al. | 244/3.13 |
| 4,571,954 | 2/1986 | Roberts et al. | 62/514 R |

OTHER PUBLICATIONS

V. V. Shkunov et al., "Optical Phase Conjugation", Scientific American, Dec. 1985, vol. 253, No. 6, pp. 54–59.

D. M. Pepper, "Applications of Optical Phase Conjugation", Scientific American, Jan. 1986, vol. 254, No. 1, pp. 74–83.

*Primary Examiner*—Stephen C. Buczinski

*Assistant Examiner*—Linda J. Wallace

*Attorney, Agent, or Firm*—John C. Garvin, Jr.; Freddie M. Bush

[57] ABSTRACT

A method and apparatus for projecting a laser beam for communication or guidance purposes wherein transmitted energy goes directly to a receiver area without requiring services of slewing or tracking devices. The energy is precisely directed from a laser transmitter on a missile toward a receiver at a tracking area. By directing the laser energy from a source on the missile during flight and by performing phase conjugating amplification of this laser energy at a tracking area station, atmospheric distortions are removed from the return energy and beam broadening is limited only to the negligible effects of diffraction broadening of the return energy, with the laser return beam being directed almost exclusively back to the missile.

5 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COVERT BEAM PROJECTOR

DEDICATORY CLAUSE

The invention described herein may be manufactured, used, and licensed by or for the Government for governmental purposes without the payment to me of any royalties thereon.

BACKGROUND OF THE INVENTION

Missile guidance systems that use laser energy for directing a missile toward a target are subject to countermeasure from the target. Typical of these systems are those employing semi-active seekers, command to line-of-sight (CLOS), and beamrider.

FIG. 1 shows a typical engagement scenario for a missile 10 which utilizes a laser semi-active seeker 12 for guidance to a target 14. A mobile vehicle 16 such as a helicoptor launches the missile toward the target. Laser energy directed from a laser designator 18 is directed to the target and reflected to the seeker 12. Aside from such commonly accepted concerns such as seeker costs, and specific laser generated target signature requirements, this guidance method suffers from susceptability to countermeasures in the form of deception signals radiated by the target. Passive seekers, not shown, are not as responsive to a laser generated signature, but are more susceptible to target signature modification such as suppression or false target generation.

FIG. 2 shows a typical engagement scenario for a CLOS missile 10A. This missile guidance method is independent of the target 14A signature, since the missile flies a straight line until impact with whatever a gunner 20 is sighting the target tracker 22 at—operation being much like a perfect rifle without ballistic drop. While it does not require a target signature (other than initial selection by a human gunner), the system still suffers a countermeasure deficiency—missile 10A must be tracked via a beacon 23 by an automatic tracker 24 which measures the angular error of the missile signature from the aiming axis. Missile tracker 24 also has the target in its field of view, allowing a smart target to provide a stronger (but false) "missile" signature and thus fool the tracker fire control into providing erroneous commands to the missile.

FIGS. 3 and 4 show a typical laser beamrider missile guidance system. This system has no seeker or missile tracker to be spoofed. At the launch site the operator 20A aims at any object or point in space desired, and a colinear laser beam, spatially encoded over its cross section, is similarly aimed from beam projector 30 by virtue of the co-linear relationship. The receiver 31 on missile 10B decodes the received signals, which are indicative of position within the beam cross section, and initiates guidance changes to correct flight to the beam center. The missile receiver, rearward looking only, is oblivious to any energy transmitted by target 14B and thus is extremely countermeasures resistant. The gunner 20A however, is still looking at the target through a type of visual optics 32, such as a television or thermal imager. If his concentration or aiming ability can be impaired the system can still be countermeasured. Two countermeasure possibilities, for example, are rapid counterfire (which may not seriously endanger the operator, but can cause sufficient apprehension to degrade aiming stability); and rapid smoke dispersal (which can cause loss of imagery to the operator or even obscure the laser communication link). By definition these countermeasure actions are rapid, initiated after launch of a missile, and therefore impractical without some means of quickly determining that a missile launch has indeed taken place. Thus, the small chance of intercepting the beamrider signal, which surrounds and bypasses the missile and impinges on the target, assumes greater significance.

SUMMARY OF THE INVENTION

A method of projecting a laser beam for communicating or guiding wherein energy is directed to an area without requiring slewing or tracking devices. Energy is directed from a laser on board a missile toward a receiver at the launch site or other tracking area. The energy is directed precisely to the receiver station without requiring slewing or tracking devices. By directing the laser energy from a source on the missile during flight and by performing phase conjugating amplification of this laser energy at the launch site or fire control station, atmospheric distortions are removed from the return energy and beam broadening is limited only to the negligible effects of diffraction broadening of the return energy, with the laser return beam being directed almost, exclusively back to the missile.

DESCRIPTION OF THE PREFERRED EMBODIMENT

Figure 1:
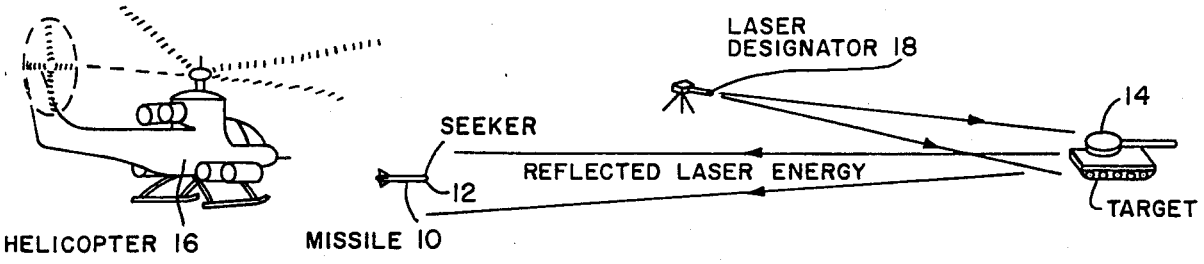
FIG. 1 PRIOR ART
FIGS. 1, 2, and 3 are typical engagement scenarios for laser guidance methods including prior art systems using semi-active seekers, command to line-of-sight, and beamrider missile guidance.
Figure 2:
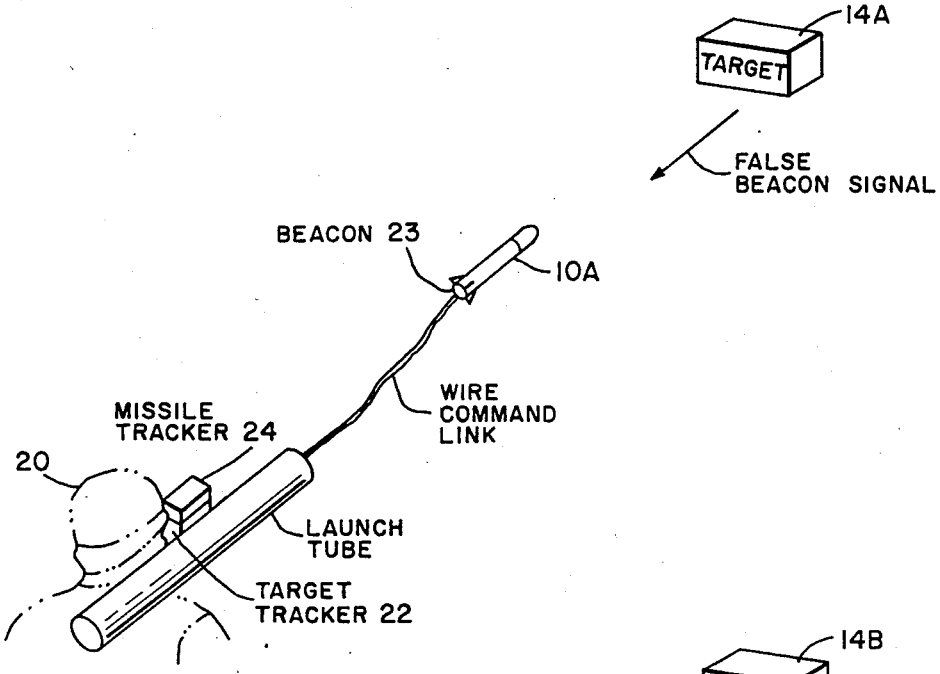
FIG. 2 PRIOR ART
Figure 3:
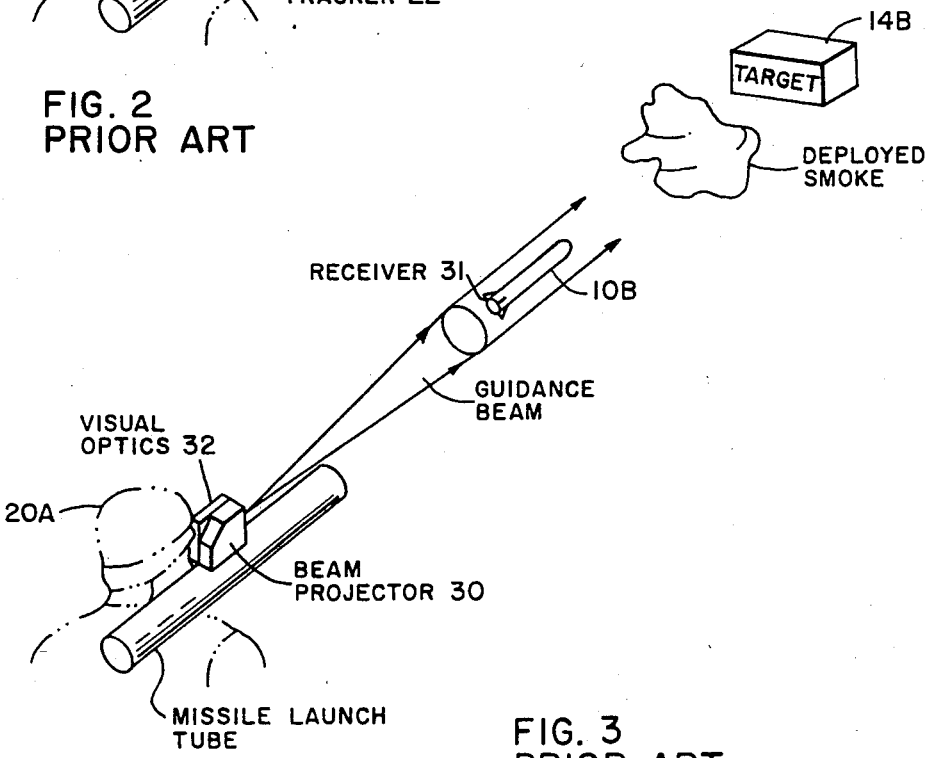
FIG. 3 PRIOR ART
Figure 4:
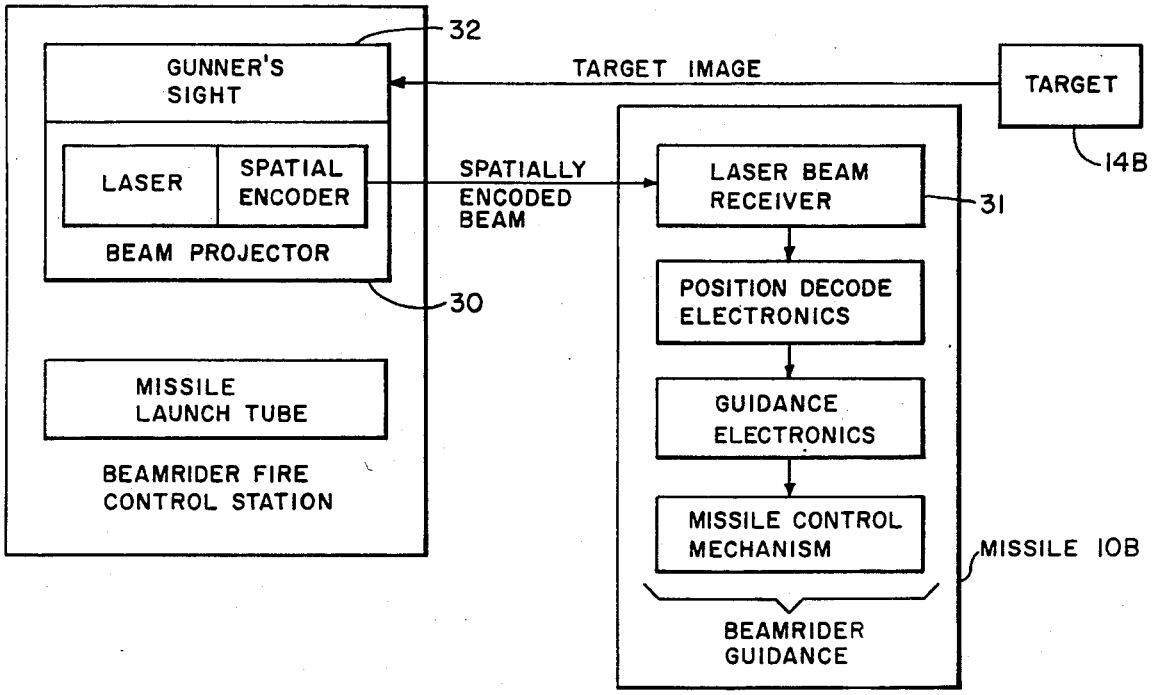
FIG. 4 PRIOR ART
FIG. 4 is a block diagram of a typical laser beamrider guidance system within the existing state of the art.
Figure 5:
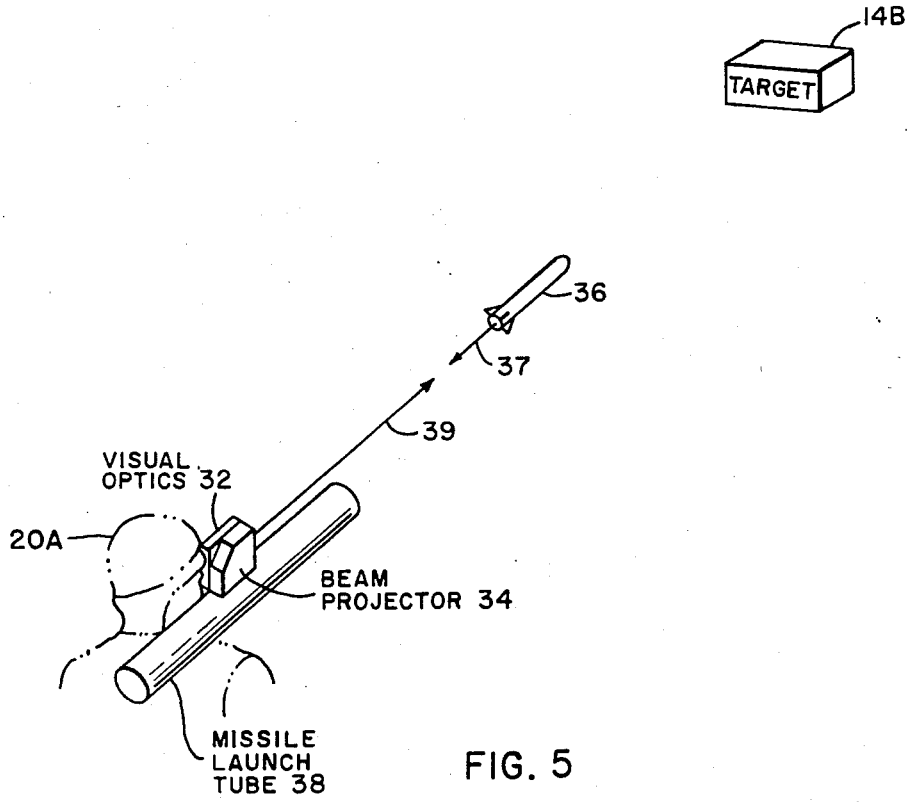
FIG. 5 is an engagement scenario for laser beamrider missile guidance having phase conjugate amplification of the return beam.
Figure 6:
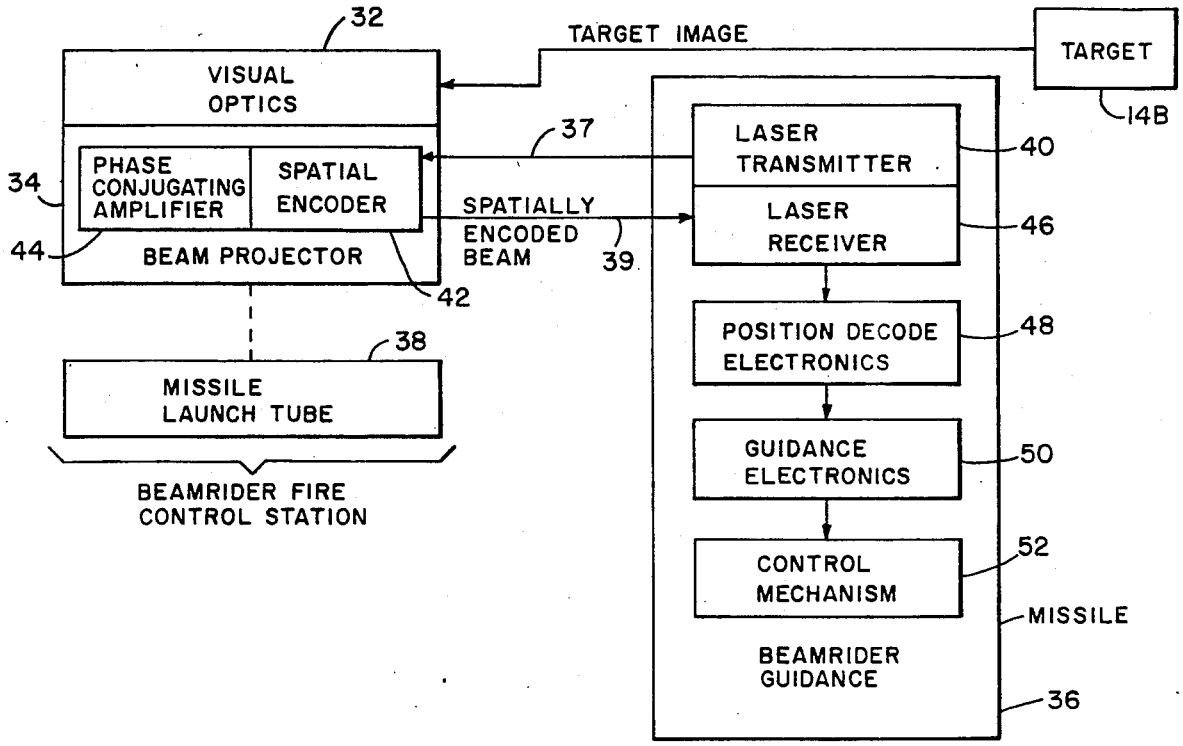
FIG. 6 is a block diagram of the laser beamrider system of FIG. 5 for providing the covert beam projection to the missile through phase conjugation.

Referring now to FIGS. 5 and 6 of the drawings wherein like numbers represent like parts, a laser beamrider missile guidance system is shown wherein a covert beam is projected. Missile 36 has a rearward directed laser source 40 for directing a laser beam 37 toward a tracking station fire control center comprising operator 20A, optics 32, beam projector 34 and launcher 38. By placing the laser source on the missile and directing a beam from the laser source toward the fire control center with the beam having a beam spread at least as great as missile body axis variations in flight, the phase conjugating amplifier 44 of projector 34 will receive the laser beam and re-direct a stronger signal 39 back to the missile, and to the missile only. In fact, were it not for beam-spreading effects of diffraction, all the re-directed energy would return and re-enter the missile laser. However, effects of diffraction by the beam projector aperture spreads the beam sufficiently to allow reception by a receiver located adjacent the laser on board the missile. This link or guidance method is now completely covert to an enemy target. By further encoding the system with a spatial technique 42 common to laser beamriders (one that is not removed by the phase conjugation process such as the raster scan spatial code), a laser beamrider is provided on this beam that has essentially no energy bypassing the missile and traveling on to the target. Thus a not-alerting feature is provided in addition to the already present countermeasure strengths of the laser beamrider.

FIG. 6 discloses further details of the laser receiver circuitry on board missile 36 for processing guidance signals and of the beam projector circuitry at the fire control site for redirecting the laser beam back toward the missile after launch of missile 36 from launch tube 38. The gunner or operator 20A maintains sight of the target through optics 32. Laser energy is directed from laser transmitter 40 to the fire control station where it impinges on beam projector 34, entering the optics of spatial encoder 42 and being coupled to phase conjugating amplifier 44. The beam entering conjugating amplifier 44 is phase conjugated and redirected back through the spatial encoder toward the source of energy (transmitter 40). Because of the inherent beamspreading effects, the receiver 46 located adjacent transmitter 40, receives the phase conjugated beam 39 which has now been spatially encoded. Phase conjugation allows the beam to be redirected back to the source (missile) with negligible spillover, reducing countermeasure possibilities from the target. The spatial encoding of the beam at the fire control station is an established procedure well known in the art, and is not shown. This encoding consists of simply providing guidance instructions through modulation of the redirected beam after it leaves amplifier 44. The guidance signals, indicative of the target position (along the look axis of optics 32), are received by receiver 46 and coupled to position decoding electronic circuitry 48, which extracts the guidance commands and couples them to guidance electronics circuit 50 for driving the missile guidance control mechanism 52 according to established methods. The fire control stabilization and track function is conventional. The beamrider, in fact, utilizes a relatively narrow guidance field; typically 6 meters diameter at the missile range, held to constant linear dimensions either by time-programmed zoom optics, or by similarly programmed reduction in scanning angle for scanning systems. The optical axis of this guidance field is boresighted to the gunner's optical sighting-device and by virtue of his aiming the sight the guidance field is pointed at the desired guidance impact point. Both of the established optical systems (gunner sight and missile guidance beam) are stabilized to permit very accurate and smooth angular track of small targets at extended range. This has been variously accomplished by mounting on a heavily damped tracking mechanism on a tripod, by incorporation into a large stabilized platform such as a tank turrent, or through use of inertially stabilized tracking by the gunner, and attendant smooth angular pointing of the fire control guidance beam and its optical axis. Without this smoothed target tracking, the phase conjugate mirrors of amplifier 34 will still direct encoded energy back to the missile even with erratic tracking; however, the spatially encoded axis would then jitter with the erratic tracking and be unacceptable for accurate guidance. Thus by using the smooth target tracking, the phase conjugate mirror field of regard remains the same small size (6 meters at missile range), and the spatial encoding around a stabilized optical axis permits the same accurate positional data (as in a conventional beamrider) to be decoded at the missile from its position relative to a stable optical axis of the received energy.

Thus covert beam projection continues to provide guidance that is similer to existing guidance methods but is unique for several reasons. The laser beamrider source is located on board the missile, radiating back toward the fire control station in the manner of a CLOS guided missile. A phase conjugating optical amplifier is located at the fire control station. This amplifier is receptive to the specific laser characteristics of the source. This phase conjugating amplifier serves much like a mirror and replaces the laser in a conventional beamrider fire control unit.

The Phase Conjugate energy generated propagates directly back to the missile (source of energy) as is well known for this phenomenon, and thus does not impinge on the target or any other location in space, aside from secondary diffraction and scattering effects. This is true whether the missile is presently located on the spatial code's optical axis or not. Additionally, the phase conjugate energy is spatially modulated by one of several techniques common to laser beamriders. For example if the easily understood raster scan beamrider technique is utilized, the phase conjugation takes place only when the scan is co-incident with the missile position, and inactive (no retransmission) at all other times. Time of reception then is indicative of position in the guidance field.

Missile reception, position decoding, and guidance to optical axis remains identical to that utilized on the conventional beamrider. Critical functions also retained from prior art systems include a spatial encoding mechanism (such as scanning galvanometers) and a stabilizing and aiming aid to permit the gunner to very accurately optically track the target and thus select the optical axis direction, which is where the missile will be guided.

Output missile laser beam width is on the order of 10 degrees (after spreading), though a good autopilot may reduce this to 5 degrees and no autopilot may increase it up to 20 degrees. Output power is limited only by the lower intensity noise limits of the phase conjugator. Using existing detector sensitivities as a guide, laser power in the beam can range from 100 watts peak (GaAs, narrow pulse, low duty factor) to 2 watts CW (a Hughes $CO_2$ laser beacon design). By using these large beamwidths, laser pointing and tracking mechanism can be omitted on the missile. The beam must cover the missile tracker at the fire control station during flight, and additional beam power is required over what would be required for narrow beam missile sources which cannot be used without such a pointing mechanism. Several versions of GaAs beacons have been flown, but the preferred implementation is with a $CO_2$ laser for smoke and aerosol penetration which is technically routine.

Aperture sizes are selected to ensure that diffraction does not destroy the beam encoding information. This is at first inspection no different than existing beamriders; however, there is a real limitation. Small high spatial frequency modulation that has been previously used for guided flights of some beamrider systems cannot be used, since it may be regarded as simply another distortion that is to be corrected (removed) by the phase conjugation process. Instead, large spatial mechanisms must be used for the encoding. They must be sufficiently large to disrupt the phase conjugation. For example, raster scan galvanometers may be used as is common and demonstrated on STINGER alternate, SABER, and other similar missile systems. This established encoding method, as implemented with the phase conjugate mirror in lieu of a laser at the fire control station, can best be understood by the following description of operation: The phase conjugate mirror 34 is restricted by a collimating lens and appropriate apertures to possess a near diffraction limit field of view in the far field of its optical system. This small field of view is then scanned in space by galvanometer mirrors, in a manner identical to the prior art scanning of the ground based projection beam. Whenever this field of view covers the missile born laser 40, the phase conjugate mirror provides a return pulse 39 to the missile, it is operative. When the field of view does not include the missile laser, the mirror is inactive, or if a noise response is present it is not sent to the missile. Guidance is then generated on board the missile (as is common to beamriders) in response to the positional information conveyed from the ground through the timing of the pulse received; such pulse occurance times being determined by the position of the missile in the guidance field, and the scanning timing of the phase conjugate mirror field of view. There are other of the many known beamrider spatial codes that may be usable, but this description is one that demonstrates the non-destruction of one beam spatial code (timing using a scanning device) by the phase conjugate mirror.

In practice, some very small beam spill-over at the missile will occur. This is due to the optical screening of laser energy by the various apertures, so the return conjugate energy is only a small sample of the original energy, and will be spread by difrraction. Spreading will also occurr to a much less extent due to minor changes in the atmospheric turbulence structure during the time required for round trip optical travel times (one nanosecond/foot). Diffraction effects are well known, and most of the energy can be placed within the diameter of small missiles. The actual distribution of the overspilled energy that goes beyond the missile is not well defined, however, but it is generally in line with the fire control center and the missile, and is diverged by the conjugate convergence at the missile (continued over additional range) and by the atmospheric turbulence from the missile to the target.

Although the present invention has been described with reference to a preferred embodiment, workers skilled in the art will recognize that changes may be made in the form and detail without departing from the scope and spirit of forgoing disclosure. Accordingly, the scope of the invention should be limited only by the claims appended hereto.

I claim:

1. In a missile guidance system wherein a target is tracked by a visual line-of-sight from a tracking station, a method for directing a missile toward a target and comprising the steps of:

visually tracking a target from a target tracking station;

launching a missile toward said target;

directing a beam of laser energy from said missile toward said tracking station;

receiving said beam at said tracking station;

performing phase conjugation on said beam at said tracking station; redirecting the phase conjugated beam back along its initial projecting path;

receiving said redirected beam by said missile; and generating directional guidance within the missile in response to said received redirected beam.

2. In a missile guidance system wherein a target is tracked from a visual line-of-sight, a method of directing a missile toward a target as set forth in claim 1 and further comprising the steps of:

encoding said phase conjugated beam after the step of performing phase conjugation so that the redirected laser beam is optically encoded for providing missile guidance along the line-of-sight.

3. A beamrider missile guidance system comprising apparatus for transmitting a laser beam along a path from a missile toward a target tracking station during trajectory of the missile toward a target; a receiver on said missile for receiving laser energy from said tracking station; laser beam projecting means at said tracking station for receiving the transmitted laser beam, phase conjugating the received beam, encoding the phase conjugated beam and redirecting the phase conjugated beam along said path back to the missile to said receiver.

4. A beamrider guidance system as set forth in claim 3 wherein said laser beam projecting means comprises a phase conjugator and a spatial encoder disposed coaxially for receiving energy and redirecting the energy back along the reception path, the received energy being coupled through the encoder into the conjugator.

5. A beamrider guidance system as set forth in claim 4 wherein said spatial encoder is a plurality of scanning galvanometers.

* * * * *